US012678823B2

(12) United States Patent
Jamaluddin

(10) Patent No.: US 12,678,823 B2
(45) Date of Patent: Jul. 14, 2026

(54) METAL CURING OVENS WITH QUICK HEAT-UP AND COOL-DOWN, AND PROCESSES OF USING SAME

(71) Applicant: EPCON INDUSTRIAL SYSTEMS, LP, Conroe, TX (US)

(72) Inventor: Aziz A. Jamaluddin, The Woodlands, TX (US)

(73) Assignee: EPCON Industrial Services, LP, Conroe, TX (US)

( * ) Notice: Subject to any disclaimer, the term of this patent is extended or adjusted under 35 U.S.C. 154(b) by 331 days.

(21) Appl. No.: 18/449,032

(22) Filed: Aug. 14, 2023

(65) Prior Publication Data

US 2023/0390800 A1 Dec. 7, 2023

Related U.S. Application Data

(62) Division of application No. 17/078,591, filed on Oct. 23, 2020, now Pat. No. 11,724,283.

(51) Int. Cl.
*B05D 3/02* (2006.01)
*F23C 7/00* (2006.01)
(Continued)

(52) U.S. Cl.
CPC .............. *B05D 3/0272* (2013.01); *F23C 7/00* (2013.01); *F26B 13/002* (2013.01); (Continued)

(58) Field of Classification Search
CPC .... B05D 3/0272; B05D 7/14; B05D 2252/02; B05D 2401/20; F23C 1/00; F23C 6/042; (Continued)

(56) References Cited

U.S. PATENT DOCUMENTS 3,396,951 A * 8/1968 Cope .................. C23C 2/00344 148/633
RE28,168 E 9/1974 Cope et al.
(Continued)

OTHER PUBLICATIONS

Tube-O-Therm(R) Low Temperature Gas Burners brochure, Maxon Corporation, 2012, p. 1-6.

*Primary Examiner* — Helena Kosanovic
*Assistant Examiner* — Benjamin W Johnson
(74) *Attorney, Agent, or Firm* — Jeffrey L. Wendt; The Wendt Firm, P.C.

(57) ABSTRACT

Insulated ovens include an oven entry enclosure having a quick cool-down fan and damper, a direct-fired, forced draft combustion chamber, a converging enclosure at a distal end of the chamber, an oven exit enclosure having an exhaust fan, and oven cool-down doors. Combustion burners form a first heated gas that heats a wet coated continuous metal sheet to form a dried, uncured continuous metal sheet having a first heated temperature higher than an initial temperature. The converging enclosure includes more burners, creating impinging flames that heat the dried, uncured continuous metal sheet, forming a continuous metal sheet having a dried, cured water-based coating having a second heated temperature higher than the first heated temperature. During cooling, actuators stop the coated continuous metal sheet upon receipt of a first signal, stop combustion except for pilot burners, open the cool-down doors and operate the quick cool-down fan to avoid waste. Burners may be relit in a second heating cycle.

6 Claims, 9 Drawing Sheets

(51) Int. Cl.

| | |
|---|---|
| ***F26B 13/00*** | (2006.01) |
| ***F26B 21/20*** | (2026.01) |
| ***F26B 21/35*** | (2026.01) |
| ***F26B 23/02*** | (2006.01) |
| *B05D 7/14* | (2006.01) |
| *F23C 1/00* | (2006.01) |
| *F23C 6/04* | (2006.01) |
| *F23C 9/06* | (2006.01) |
| *F23D 99/00* | (2010.01) |
| *F23L 15/00* | (2006.01) |
| *F26B 21/25* | (2026.01) |

(52) U.S. Cl.

CPC ............ *F26B 21/208* (2026.01); *F26B 21/35* (2026.01); *F26B 23/02* (2013.01); *B05D 7/14* (2013.01); *B05D 2252/02* (2013.01); *B05D 2401/20* (2013.01); *F23C 1/00* (2013.01); *F23C 6/042* (2013.01); *F23C 9/06* (2013.01); *F23D 99/004* (2025.08); *F23L 15/00* (2013.01); *F26B 21/25* (2026.01)

(58) Field of Classification Search

CPC .. F23C 7/00; F23C 9/06; F23D 99/004; F23L 15/00; F26B 13/002; F26B 21/028; F26B 21/04; F26B 21/10; F26B 23/02

USPC ........................................................... 431/18

See application file for complete search history.

(56) References Cited

U.S. PATENT DOCUMENTS

| | | | | | |
|---|---|---|---|---|---|
| 3,851,091 | A * | 11/1974 | Laws | F27B 9/22 432/127 |
| 4,140,467 | A * | 2/1979 | Ellison | F26B 23/022 110/204 |
| 4,240,787 | A | 12/1980 | Jamaluddin | |
| 4,242,084 | A | 12/1980 | Jamaluddin | |
| 4,299,036 | A | 11/1981 | Schregenberger | |
| 4,322,203 | A | 3/1982 | Jamaluddin | |
| 4,936,771 | A * | 6/1990 | Sidwell | F27B 9/40 432/127 |
| 5,439,704 | A | 8/1995 | Sankaran | |
| 5,490,315 | A | 2/1996 | Kostopolos | |
| 6,135,765 | A | 10/2000 | Jamaluddin | |
| 6,149,707 | A | 11/2000 | Jamaluddin | |
| 9,726,429 | B1 | 8/2017 | Jamaluddin | |
| 10,099,248 | B2 | 10/2018 | Jamaluddin | |
| 10,792,701 | B2 | 10/2020 | Jamaluddin | |
| 2002/0114884 | A1 * | 8/2002 | Friedersdorf | B05D 7/546 427/407.1 |
| 2010/0248169 | A1 * | 9/2010 | Morgan | F23C 5/06 431/18 |
| 2017/0219286 | A1 | 8/2017 | Jamaluddin | |
| 2017/0241013 | A1 | 8/2017 | Jamaluddin | |

* cited by examiner

METAL CURING OVENS WITH QUICK HEAT-UP AND COOL-DOWN, AND PROCESSES OF USING SAME

CROSS-REFERENCE TO RELATED APPLICATIONS

This application is a divisional of, and entitled to and claims the benefit of earlier filed nonprovisional application Ser. No. 17/078,591, filed Oct. 23, 2020 (now U.S. Pat. No. 11,724,283, issued Aug. 15, 2023) which earlier filed nonprovisional application is incorporated by reference herein in its entirety.

BACKGROUND INFORMATION

Technical Field

The present disclosure relates generally to the field of industrial ovens, especially for coil coating curing ovens for water-based painted or coated hot-rolled steel products. The invention is particularly concerned with industrial ovens in a continuous painting and curing operations, having fast heat-up, when the line starts, and quick cool-down, when the line stops, with the abilities to avoid waste of material in the oven, which typically would be subjected to higher temperatures and burns.

Background Art

In painting or coating industrial products, such as sheet metal coils, hot-rolled and cold-rolled, steel pipes, steel drums and any multitude of coated and painted products, it is well known to use either gas-fired or electrically-heated ovens which will dry/cure the painted or coated products. Such ovens may be operated at low temperature, intermediate temperature, or high temperature, depending upon the type of coating and the particular stage in the processing of the coated product.

In certain practices, water-based red primer, iron oxide, is applied on a moving hot-rolled sheet steel utilizing coater rollers, similar to printing operation. Prior to painting, the sheet steel is typically washed, cleaned, phosphatized (cold-rolled steel) and the hot-rolled steel sand- or shot-blasted to clean the metal surfaces of any rust or oil. Then the coating is applied by a coating machine or "coater." The coating has to be cured in an oven, either electric infrared (IR) heaters or gas-fired. Coil coating is a continuous painting and curing operation. Change of coils at the "uncoiler" and "recoiler" (entry and exit of the line) is accomplished through looping towers (also termed accumulators). An entry accumulator, which is properly designed for the line speed, holds several feet of sheet steel and when a new sheet steel coil is being placed on the uncoiler mandrel, the entry accumulator or looping tower continuously feeds the line and within a matter of a minute to a minute and a half, the sheet steel coil is changed and "stitched" (welded), and then the depleted entry accumulator fills up again. The reverse operation takes place at the line exit end. When the line stops at the exit end, for a coil change, the incoming material fills the depleted exit accumulator, until the changeover is accomplished.

The accumulators are typically made of heavy structural steel material, urethane covered rolls and complex hydraulic system for the rolls carriage to go up and down. The accumulator systems are therefore costly. For this reason, on a limited basis, accumulators are removed from certain coil coating operations such as building purlins manufacturing and inexpensive pre-painted materials. This is purely for cost reasons. However, when accumulators are removed from the systems, the coil lines become "start/stop" lines; meaning, every time there is a coil change, at the entry or exit, the line stops for about 60 to 90 seconds. Electric infrared (IR) curing ovens were then used because electric ovens can be shut off when the line stops.

Although the use of IR ovens allowed removal of the expensive entry and exit accumulators, after building a coil line with electric infrared (IR) ovens, the following unforeseen problems arose. The coil (the material) inside the oven stays more than a minute to two minutes, allowing the paint on the strip to burn for the entire material; 40 to 50-ft long steel sheet is wasted, because of the burned paint. Another problem is that the strip falls on the electric infrared (IR) modules, damaging them. The infrared (IR) modules must be changed frequently, at a very high cost. The replacement cost of the infrared (IR) modules is in the thousands of dollars. The cost of electricity to operate IR ovens is an exorbitant expense. Generally, IR ovens use 3000 Kw/hour. The cost of the electricity to run one IR oven may be hundreds of thousands of dollars, per month.

These were the reasons that prompted me to develop an innovative and unique oven which would address the issues mentioned above. In particular, it is desirable not to waste the strip of steel or other material from when the oven shuts down, and to eliminate costly replacement of the electric control modules.

SUMMARY

In accordance with the present disclosure, methods and systems are presented that may reduce or eliminate problems with known methods and systems. In certain methods and systems of the present disclosure, destruction of IR heating modules in industrial ovens may be completely eliminated, with less energy cost than in previous systems and methods.

One aspect of the disclosure is a method comprising (or consisting of, or consisting essentially of):

(a) in a first heating cycle, moving a wet coated continuous metal sheet having first and second sides and comprising a water-based coating (emulsion) at an initial temperature on one or both first and second sides into an oven entry enclosure having a quick cool-down fan and a damper attached thereto;

(b) moving the wet coated continuous metal sheet through one or more direct-fired, forced draft combustion chambers, the one or more direct-fired, forced draft combustion chambers mechanically and fluidly connected to the oven entry enclosure, the one or more direct-fired, forced draft combustion chambers each comprising one or more direct-fired, forced draft combustion line burners and one or more blowers;

(c) maintaining temperature in the one or more direct-fired, forced draft combustion chambers by at least intermittently combusting a fuel with an oxygen-containing gas in the one or more direct-fired, forced draft combustion line burners, forming a first heated direct-fired, forced draft combustion chamber gas, heating the wet coated continuous metal sheet in the first heated direct-fired, forced draft combustion chamber gas to form a dried, uncured coated first cycle heated continuous metal sheet having a first heated temperature higher than the initial temperature;

(d) moving the dried, uncured coated first cycle heated continuous metal sheet through a converging enclosure at a distal end of the one or more direct-fired, forced draft combustion chambers, the converging enclosure comprising one or more upper direct-fired flame impingement burners and one or more lower direct-fired flame impingement burners, and then through an exit enclosure having an exhaust fan;

(e) combusting a second fuel with a second oxygen-containing gas in the one or more upper direct-fired flame impingement burners and one or more lower direct-fired flame impingement burners, creating upper and lower flames flowing substantially counter-currently to the dried, uncured coated first cycle heated continuous metal sheet, heating the dried, uncured coated first cycle heated continuous metal sheet in the upper and lower flames, forming a dried, cured first cycle coated continuous metal sheet having first and second sides and comprising a dried, cured water-based coating having a second heated temperature higher than the first heated temperature, the second heated temperature sufficient to form the dried, cured first cycle coated continuous metal sheet;

(f) stopping the moving of the wet coated continuous metal sheet, the dried, uncured coated first cycle heated continuous metal sheet, and the dried, cured first cycle coated continuous metal sheet;

(g) stopping the combusting in the one or more line burners, the one or more upper flame impingement burners, and the one or more lower flame impingement burners, but maintaining combustion of one or more pilot burners; and (h) opening one or more (hydraulically, pneumatically, or electrically actuated) cool-down doors on the one or more direct-fired, forced draft combustion chambers, allowing ambient air to flow into the one or more direct-fired, forced draft combustion chambers in a cooling cycle, reducing temperature of the dried, uncured coated first cycle heated continuous metal sheet, and the dried, cured first cycle coated continuous metal sheet (to less than about 150° F.).

In certain method embodiments, the combusting of fuel with an oxygen-containing gas in the one or more combustion burners comprises combusting of fuel with an oxygen-containing gas in the one or more roof-mounted combustion line burners.

Certain method embodiments may comprise moving the dried, uncured coated first cycle heated continuous metal sheet through a converging enclosure, the converging enclosure comprising one or more direction adjustable upper oven roof-mounted, packaged burners and one or more direction adjustable lower oven (lower panel-mounted packaged burners. Certain methods may comprise moving the dried, uncured coated first cycle heated continuous metal sheet through a converging enclosure, the converging enclosure comprising one or more direction adjustable roof-mounted, packaged burners and one or more direction adjustable lower panel-mounted packaged burners.

In certain method embodiments the dried water-based coating may be heated to a second heated temperature of at least about 530° F.

In certain method embodiments, the stopping of the combusting in the one or more line burners, the one or more upper oven burners, and the one or more lower oven burners occurs immediately after the stopping of the moving of the wet coated continuous metal sheet, the dried, uncured coated first cycle heated continuous metal sheet, and the dried first cycle coated continuous metal sheet. In certain method embodiments, the stopping of the combusting in the one or more line burners, the one or more upper oven burners, and the one or more lower oven burners occurs simultaneously with the stopping of the moving of the wet coated continuous metal sheet, the dried, uncured coated first cycle heated continuous metal sheet, and the dried first cycle coated continuous metal sheet.

In certain method embodiments the opening of the one or more cool-down doors on the direct-fired, forced draft combustion chamber may be actuated hydraulically, pneumatically, or electrically.

In certain embodiments, the cooling cycle allows the dried, uncured coated first cycle heated continuous metal sheet and the dried, cured first cycle coated continuous metal sheet to be cooled to a temperature less than about 150° F.

Certain method embodiments may comprise wherein the direct-fired, forced draft combustion chamber is maintained at a temperature ranging from about 400° F. to about 600° F. (from about 204° C. to about 315° C.), or from about 450° F. to about 550° F. (from about 232° C. to about 288° C.), in certain embodiments using one or more temperature sensors, thermostats, dampers, and sources of fresh ambient temperature air (ambient temperature as used herein means temperatures ranging from about 20 to about 25° C., although ambient temperatures lower and higher than these may be contemplated).

Certain methods comprise operating the exhaust fan to maintain a negative pressure in the direct-fired, forced draft combustion chamber, the entry enclosure, and the exit enclosure.

Another aspect of the disclosure is a system (sometimes referred to herein as a quick heating, quick cool-down oven) comprising (or consisting essentially of, or consisting of):

(a) an insulated oven comprising:
   (i) an oven entry enclosure having one or more quick cool-down fans and one or more dampers attached thereto,
   (ii) a direct-fired, forced draft combustion chamber mechanically and fluidly connected to the oven entry enclosure and comprising one or more direct-fired, forced draft combustion chamber burners configured to combust a fuel with an oxygen-containing gas creating a first heated direct-fired, forced draft combustion chamber gas to heat a wet coated continuous metal sheet in the first heated direct-fired, forced draft combustion chamber gas to form a dried, uncured coated first cycle heated continuous metal sheet having a first heated temperature higher than an initial temperature;
   (iii) a converging enclosure at a distal end of the direct-fired, forced draft combustion chamber, the converging enclosure comprising one or more upper direct-fired flame impingement burners and one or more lower direct-fired flame impingement burners configured to combust a second fuel with a second oxygen-containing gas in the one or more upper direct-fired flame impingement burners and one or more lower direct-fired flame impingement burners and create upper and lower flames flowing substantially counter-currently to the dried, uncured coated first cycle heated continuous metal sheet, forming a dried, cured first cycle coated continuous metal sheet having first and second sides and comprising a dried, cured water-based coating having a second heated temperature higher than the first heated temperature;
   (iv) an oven exit enclosure having one or more exhaust fans fluidly connected to the oven exit enclosure; and
   (v) one or more cool-down doors on the direct-fired, forced draft combustion chamber;

(b) one or more first actuators configured to stop the wet coated continuous metal sheet, the dried, uncured coated first cycle heated continuous metal sheet, and the dried, cured first cycle coated continuous metal sheet upon receipt of a first signal;

(c) one or more second actuators configured to stop combustion in the one or more direct-fired, forced draft combustion chamber burners, the one or more direct-fired flame impingement upper burners, and the one or more direct-fired flame impingement lower burners, but maintain combustion of one or more pilot burners; and (d) one or more third actuators configured to open the one or more cool-down doors on the direct-fired, forced draft combustion chamber, and one or more fourth actuators to operate the one or more quick cool-down fans and the one or more dampers to allow ambient air to flow into the direct-fired, forced draft combustion chamber in a cool-down cycle upon receipt of a control signal to begin the cool-down cycle and reduce temperature of the dried, uncured coated first cycle heated continuous metal sheet and the dried, cured first cycle coated continuous metal sheet.

In certain system embodiments the one or more dampers may be a thermostatic damper controlled by a thermostat. Certain system and method embodiments may employ one or more programmable logic controllers (PLCs). In certain embodiments the insulation material may be selected from the group consisting of aerogel, glass fiber, mineral fiber, cellular glass foam, polyisocyanurate foam, and combinations and composites thereof. In certain embodiments the insulation material may have a metal foil and/or hex wire backing or facing, and in such embodiments, the metal foil may completely or only partially enclose the insulation material.

In certain system embodiments the combustion burners may be nozzle-mix, gas fired, ceramic-less burners. In certain system embodiments the upper and lower combustion burners in the converging enclosure may be packaged burners. In certain system embodiments the burners in the direct-fired forced draft combustion chamber may be line burners.

In certain system embodiments the direct-fired forced draft combustion chamber, oven entry enclosure, and oven converging enclosure may comprise one or more structures (baffles, distributor plates, grids, and the like) for causing a tortuous flow path for the heated or cooled gas stream flowing therethrough.

Methods and systems of this disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
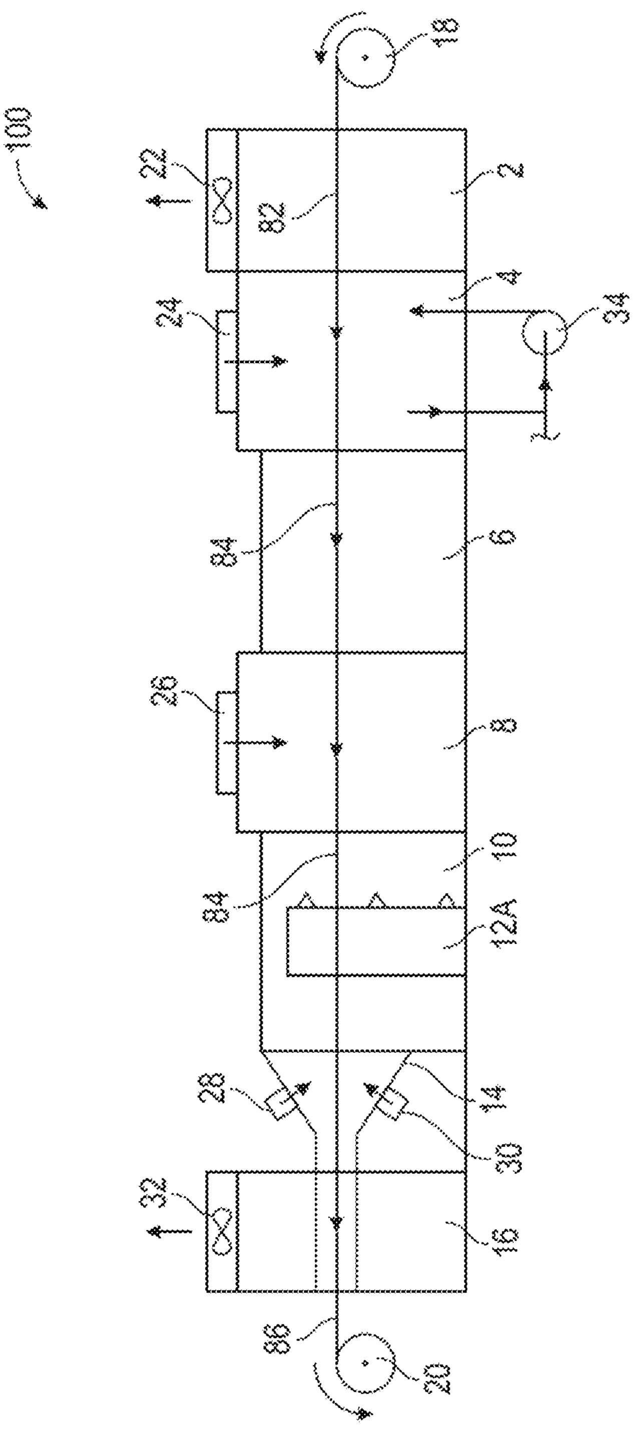
FIG. 1 is a schematic process flow diagram of one method and system embodiment in accordance with the present disclosure.

It is to be noted, however, that the appended drawings are schematic in nature, may not be to scale (in particular FIGS. 1-10 and 12-13), and illustrate only typical embodiments of this disclosure and are therefore not to be considered limiting of its scope, for the disclosure may admit to other equally effective embodiments.

DETAILED DESCRIPTION

In the following description, numerous details are set forth to provide an understanding of the disclosed methods and systems. However, it will be understood by those skilled in the art that the methods and systems covered by the claims and otherwise described herein may be practiced without these details and that numerous variations or modifications from the specifically described embodiments may be possible and are deemed within the claims. For example, it will be understood that wherever the term "comprising" is used, other embodiments and/or components and/or steps where "consisting essentially of" and "consisting of" may be substituted for "comprising" are explicitly disclosed herein and are part of this disclosure. Moreover, the use of negative limitations is specifically contemplated; for example, certain systems and methods may comprise a number of physical hardware and software components and features but may be devoid of certain optional hardware and/or software and/or other features, such as one or more manifolds, valves, bypass conduits, thermostats, and temperature and flow sensors. As another example, certain servers suitable for use herein may include computer software and hardware components pertinent to particular end uses but may be devoid of other components and/or software, depending on the wishes of the design, facility owner, or other end user. Computers and servers may, in certain embodiments, be devoid of any other use than for use in or with the aspects of this disclosure. All published patent applications and patents referenced herein are hereby explicitly incorporated herein by reference. In the event definitions of terms in the referenced patents and applications conflict with how those terms are defined in the present application, the definitions for those terms that are provided in the present application shall be deemed controlling.

One use of methods and systems of the present disclosure is for curing water-based coatings on continuous metal sheet products. In fact, I developed the unique and innovative ovens of the present disclosure mainly for processing of painting of heavy duty metal purlins for coil coating lines, and for normal usage for the coil coating lines. Most metal buildings have 14 gauge purlins which are used as a structural member to support the roof and the walls. Purlins are in the shape of a "Z" that is why they are sometimes referred to as "Z purlins" in this art. The use of "Z purlins" for metal building construction for walls and the roof is universal, meaning, virtually all metal buildings must have "Z purlins" to attach the sheet metal. As explained briefly in the Background, the use of IR ovens allowed removal of the expensive entry and exit accumulators in these coil lines; however, after building a coil line with electric IR ovens, the following unforeseen problems arose. The wet-coated continuous metal sheet, when caused to remain inside the oven upon a stoppage of the process, stays more than a minute to two minutes stationary in the oven, allowing the wet paint on the continuous metal sheet, and the continuous metal sheet itself, to burn for the entire length of material inside the oven; 40 to 50-ft of continuous metal sheet (usually steel, although other metals or alloys may be similarly treated) is wasted, because of the burned paint. Another problem is that the continuous metal sheet falls on the IR modules, destroying them. The IR modules must be changed frequently, at a very high cost. The replacement cost of the IR modules is in the thousands of dollars. The cost of electricity to operate IR ovens is an exorbitant expense. Generally, IR ovens use 3000 Kw/hour. The cost of the electricity to run one IR oven may be hundreds of thousands of dollars, per month.

Figure 2:
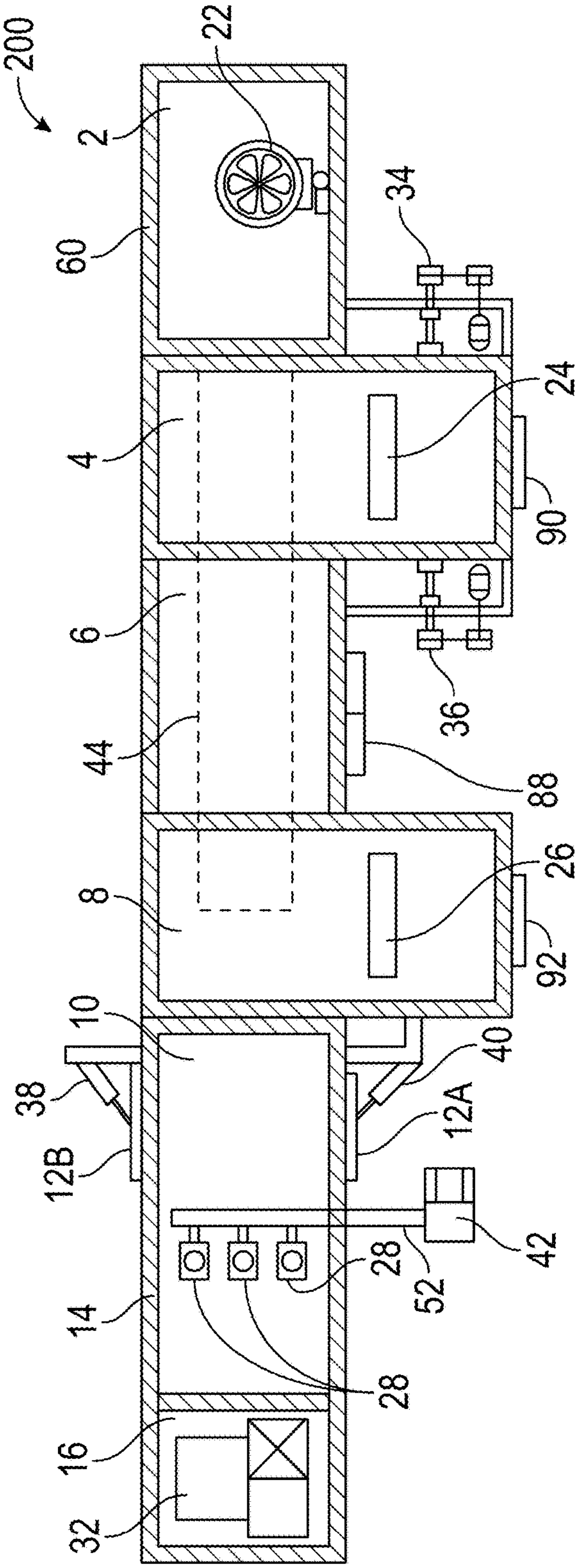
FIGS. 2 and 3 are schematic plan and side elevation view illustrations, respectfully, each partially in cross-section, of a system embodiment in accordance with the present disclosure.

On the other hand, electric IR is highly efficient for very short length ovens compared to a gas-fired convection oven. Systems and methods of the present disclosure take advantage of the principles of both electric IR and forced convection combustion burners. I designed the oven with both advantages in mind, as a high velocity forced convection oven, in certain embodiments with two (2) combustion chambers, equipped with $4\times10^6$ BTU/hr. burners, each, and a quantity of (2) recirculation fans, 33,000 $ft^3$/min ("CFM"), each. In these embodiments there are 132,000 CFM recirculation using forced convection. Forced convection is mechanical energy along with thermal energy, which is highly efficient in enhancing the coefficient of heat transfer. Then, to simulate electric IR, certain embodiments include a quantity of six (6) burners (with 3 burners on top and 3 burners on the bottom) that are used to directly fire and impinge on the moving, coated continuous steel sheet. The direct-fired, open flames are located towards the exit end of the ovens, and the heat is directed substantially counter-flow to the steel sheet movement. (As used herein "substantially counter-flow" means the flows are not always parallel to the movement of the steel sheet, but may be at an angle between parallel and perpendicular thereto, as illustrated in FIG. 2.)

In order to polymerize and cure water-based iron oxide coatings on continuous steel sheets, the peak metal temperature should range from about 500° F. to about 550° F. (from about 260° C. to about 288° C.), or from about 520° F. to about 540° F. (from about 271° C. to about 282° C.), or from about 525° F. to about 535° F. (from about 274° C. to about 279° C.). Curing of other coatings may require other peak metal temperatures that are easily identified without undue experimental by the skilled artisan.

The purpose of the one or more direct-fired, forced draft combustion chambers is to heat the moving continuous steel sheet from an initial temperature (which may be ambient temperature or higher, up to about 150° F. (about 66° C.) to a first heated temperature of about 400° F. (about 204° C.), and prior to reaching the direct-fired impingement burners. The direct-fired impingement burners raise the temperature from the first temperature of about 400° F. (about 204° C.) to a second heated temperature of about 500° F. (about 260° C.), or about 510° F. (about 266° C.), or about 520° F. (about 271° C.), or about 530° F. (about 277° C.), or about 540° F. (about 282° C.), or about 550° F. (about 288° C.). The residence time of the continuous steel sheet in the flames of the direct-fired impingement burners is in most embodiments a fraction of a second, for example, about 0.1 sec, about 0.2 sec, about 0.3 sec, about 0.4 sec, about 0.5 sec or more up to about 1 sec. The heat from the direct-fired impingement burners is balanced with the line speed of the moving continuous steel sheet sufficient to raise the temperature of the moving steel sheet from about 400° F. to about 500° F. (from about 204° C. to about 260° C.), or about 510° F. (about 266 C), or about 520° F. (about 271° C.), or about 530° F. (about 277° C.), or about 540° F. (about 282° C.), or about 540° F. (about 282° C.), or about 550° F. (about 288° C.).

In certain embodiments, when the line is shut down, the burners will shut off and only pilot burners will remain operating. In further embodiments, one or more large doors open automatically when the line stops, and a large capacity (for example 50,000 CFM or more) fan will start, at the entry end, equipped with shut-off damper. The shut off damper and fan will start to evacuate the heat from the oven and exhaust the heat to atmosphere at a very rapid rate. In a matter of seconds, the oven will cool down the strip from its peak heat temperature (about 530° F. (about 277° C.)) down to about 150° F. (about 66° C.), in certain embodiments, and this will not burn the paint on the strip. This avoids wasted material, eliminates the replacement costs of the IR modules, and the fuel gas consumption is a small fraction of the electric cost (approximately $1/20^{th}$ the cost of electricity). Typically, a steel or aluminum substrate is delivered in coil form from a rolling mill to a coating plant for coating. Another example is a 55-gallon drum manufacturing plant, where the drums and lids must be cleaned and painted. Essentially any manufacturing operation where coatings are applied in one or multiple phases may benefit from the methods and systems of the present disclosure.

Fuel for the line and package burners may be oxidized in presence of oxygen (either supplied as industrial oxygen, oxygen-enriched air, or air) and form $CO_2$ and $H_2O$, or in some embodiments a combination of CO, $CO_2$, and $H_2O$. After leaving the line burners in the direct-fired, forced draft combustion chamber, the now hot line burner exhaust gases, which now have high thermal energy, are recirculated by recirculation fans or blowers into upper and lower plenums through transition ducts. The plenums have perforations or nozzles, allowing the hot exhaust gases to contact and release thermal energy to the wet coating on the moving continuous steel sheet, and relatively cooler gases are recirculated back to the line blowers.

In certain embodiments, motorized dampers may be employed on oven zones to control the hot air volume based on temperature sensor feedback. A motorized damper arrangement may be utilized to achieve temperature control in oven zones by, for example, controlling exhaust temperature of line burners. One or more recirculation blowers and one or more exhaust blowers may be used to control gas flows, providing positive and negative pressure where needed in the systems. The line burners may be operated intermittently, meaning that they may be shut off while the heated air and combustion gases circulate through the oven using blowers. As long as the temperature in the oven remains at or above a setpoint temperature, the line burners are not needed.

Various terms are used throughout this disclosure. "Indirect heating" as used herein means that a hot fluid exchanges heat with a cooler fluid, usually through one or more heat transfer surfaces such as plates or tubes, without mixing of the fluids. "Direct heating" means burner exhaust gases (which may be flames) either contact the moving, continuous metal sheet (in which case they may be termed impingement burners), or radiant heat from the flames (but not the flames themselves) impinges upon the flames.

As used herein the phrase “combustion gases” means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels. “Burner exhaust”, and “burner flue gas” are equivalent terms and refer to a combination of combustion gases and other effluent from combustion burners, such as adsorbed water, water of hydration, CO, $CO_2$ and $H_2O$ liberated from combustion of hydrocarbons, and the like. Therefore burner exhaust may comprise oxygen or other oxidants, nitrogen, combustion products (including but not limited to, carbon dioxide, carbon monoxide, $NO_x$, $SO_x$, $H_2S$, and water) and uncombusted fuel.

“Oxidant” as used herein includes air, gases having the same molar concentration of oxygen as air (for example “synthetic air”), oxygen-enriched air (air having oxygen concentration greater than 21 mole percent), and “pure” oxygen grades, such as industrial grade oxygen, food grade oxygen, and cryogenic oxygen. Oxygen-enriched air may have 50 mole percent or more oxygen, and in certain embodiments may be 90 mole percent or more oxygen. Primary, secondary, and tertiary oxidant are terms understood in the combustion burner art; burners employed herein may use any one or more of these.

The term “fuel”, according to this disclosure, means a combustible composition comprising a major portion of, for example, methane, natural gas, liquefied natural gas, propane, butane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term “fuel” includes gaseous fuels, liquid fuels, aerosol fuels, flowable solids, such as powdered carbon or particulate material, waste materials, slurries, and mixtures or other combinations thereof.

The sources of oxidant and fuel may be one or more conduits, pipelines, storage facilities, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

“Oven” as used herein means industrial ovens, particularly primer and paint bake ovens, or ovens for drying or curing other coatings. Ovens may be of various capacities, lengths and heat input. An “exterior” bake oven means an oven used for baking or curing an exterior coating on a substrate. Ovens may be heated by various heating methods, such as burners, electric heating coils, or infrared heaters. Different ovens may exhaust into a common manifold, or separate holding containers to be mixed later. For drums, one oven may be used for drum lids, another oven for linings, and another oven for the prime bake oven. The combustion chamber burners and fans may be mounted on top of an oven. Each combustion chamber burner may have a capacity ranging from about 500,000 to about 10,000,000 BTU/hr. and be accompanied by recirculation fans or blowers having capacity ranging from 5,000 to 50,000 CFM. Ovens may be of high velocity design and highly efficient using approximately 40 to 50 percent less fuel than a conventional convection oven. The exhaust from multiple ovens may be collected through manifold.

Referring now to the drawing figures, FIG. 1 is a schematic process flow diagram of one method and system embodiment 100 in accordance with the present disclosure, including as main components from right to left: a substantially closed entry enclosure 2 having a slot opening having width and height sufficient to allow a continuous metal sheet to enter the oven; a first direct-fired, forced draft combustion chamber (also referred to herein as “FDFFDCC” as a short-hand notation) 4; a first transition chamber 6; a second direct-fired, forced draft combustion chamber (also referred to herein as “SDFFDCC”) 8, a second transition chamber 10 including quick cool-down doors 12A and 12B (the term “quick cool-down” is also referred to herein as “QCD”); a converging section 14; a substantially closed exit enclosure 16; a QCD fan 22; roof-mounted direct-fired forced draft burners 24, 26, upper direct-fired flame impingement burners 28 and lower direct-fired flame impingement burners 30 positioned in converging section 14; and an exhaust fan 32. Most of these components are insulated with insulation 60, and therefore the ovens are referred to herein as “insulated ovens.” Method and system embodiment 100 further includes one or more recirculation fans and motors 34 fluidly and mechanically connected to FDFFDCC 4 and SDFFDCC 8, whose position and function will be further explained herein. As used herein the term “substantially closed”, when referring to entry and exit enclosures 2 and 16, means these enclosures each have a slot opening having width and height sufficient to allow a continuous metal sheet to enter and exit the oven, as well as other openings sufficient to allow gases to pass through dampers therein for QCD fan 22 and exhaust fan 32.

The term “CMS” is used herein to refer to a “continuous metal sheet.” Optional supply/uncoiler 18 and a take-up/recoiler 20 are illustrated schematically in FIG. 1, as is a wet coated first cycle CMS being heated 82. Supply/uncoiler 18 and take-up/recoiler 20 are not considered a part of the methods and systems of the present disclosure, and in fact may not be present if wet coated CMS being heated 82 is directed directly from a coater machine (not illustrated), and if a dried, cured first cycle coated CMS 86 is directed to another station. An intermediate CMS, termed herein a dried, uncured coated first cycle heated CMS 84, is also illustrated schematically in FIG. 1. The use and meaning of “first cycle” will become apparent as methods and systems of the present disclosure are explained herein.

Figure 3:
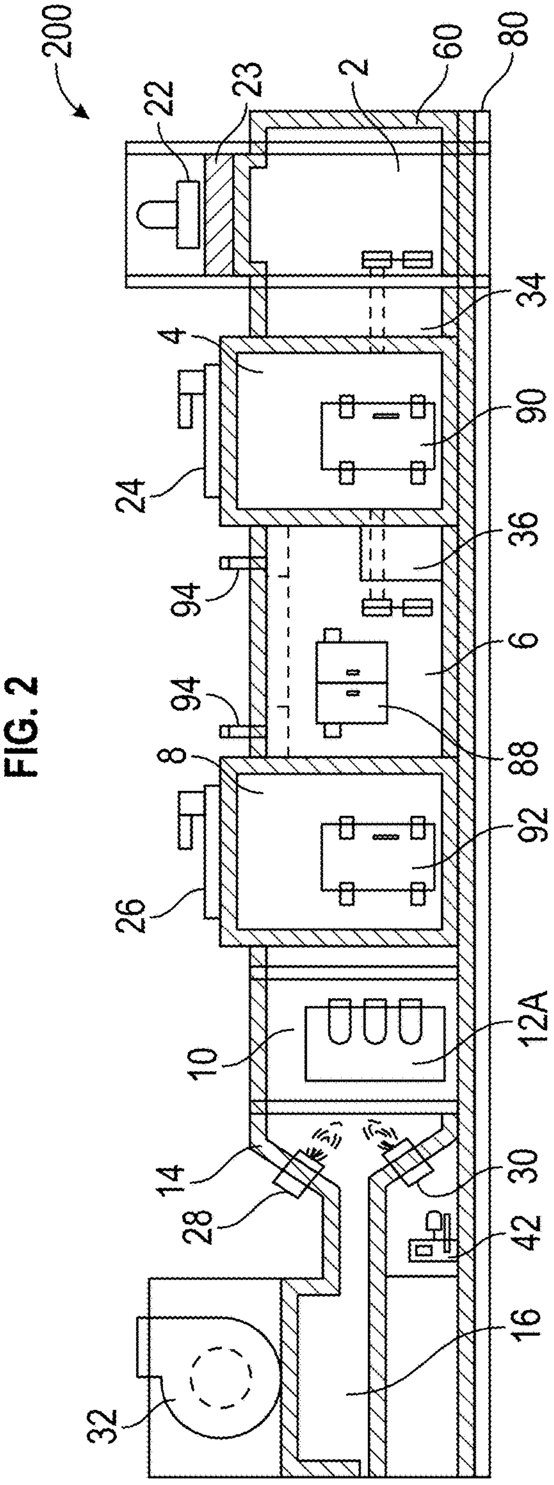

FIGS. 2 and 3 are schematic plan and side elevation view illustrations, respectfully, each partially in cross-section, of a system embodiment 200 in accordance with the present disclosure. System 200 includes all of the features and components of embodiment 100, and further includes a downstream recirculation fan and motor 36 on FDFFDCC 4. In certain embodiments, upstream and downstream recirculation fans and motors may also be provided on SDFFDCC 8, such as illustrated schematically in FIG. 4 at 48, 50. Systems 100 and 200 further include QCD door actuators 38, 40 (not illustrated in FIG. 1). Systems 100 and 200 further include a combustion oxidant blower fan 42 for upper and lower direct-fired flame impingement burners 28, 30. FIG. 2 illustrates a supply conduit 52 fluidly connecting combustion oxidant blower fan 42 with upper direct-fired flame impingement burners 28. A similar conduit 54 branches off from conduit 52 and fluidly connects fan 42 with lower direct-fired flame impingement burners 30 (as illustrated schematically in FIG. 4). A control panel 88 may be located on the outside of first transition chamber 6. Access doors 90, 92 may be provided for accessing FDFFDCC 4 and SDFFDCC 8. Fuel gas source conduits 94 feed burner gas trains for the burners (the gas trains themselves are not illustrated).

Figure 12:
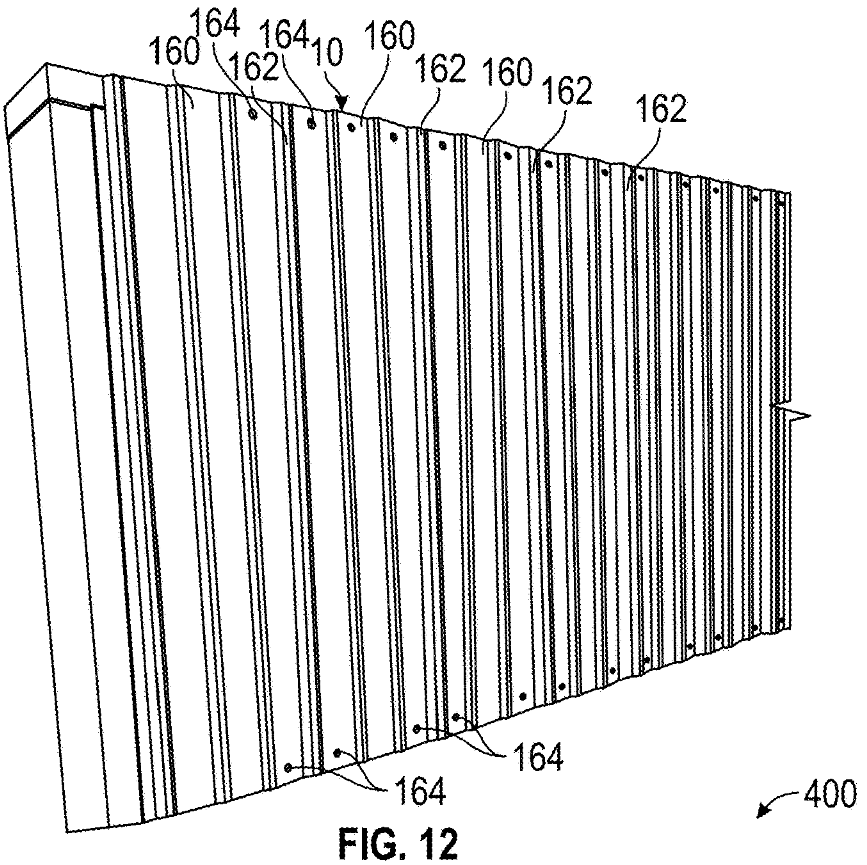
FIGS. 12 and 13 are schematic perspective views of a plenum wall with nozzles, and a nozzle, respectively, useful in systems and methods of the present disclosure.
Figure 13:
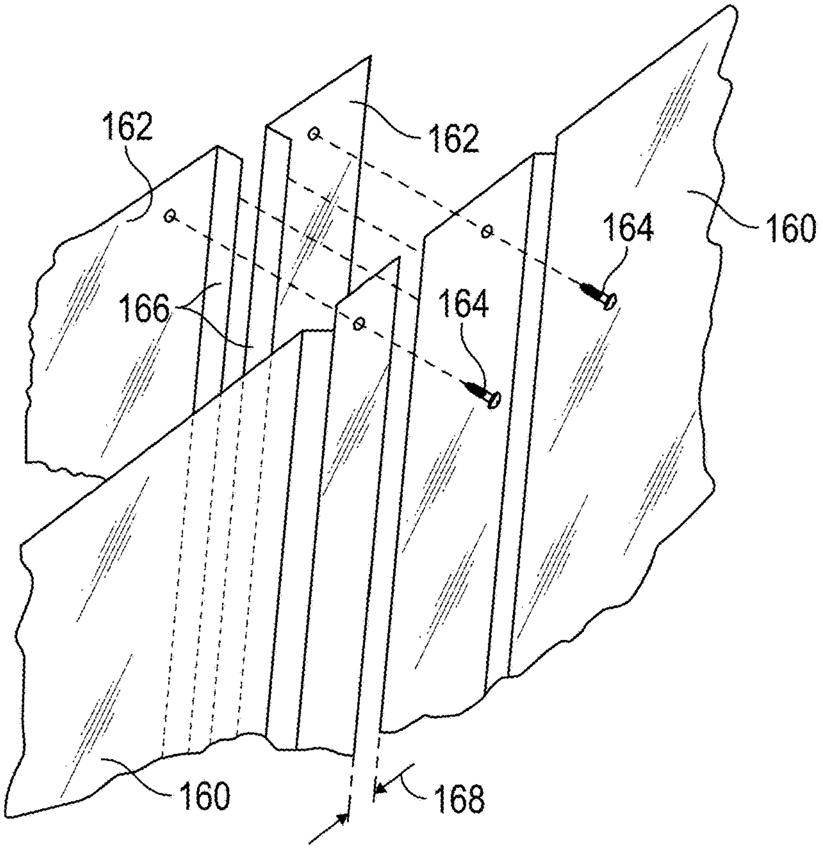

An important feature of embodiment 200 is provision of an upper plenum 44, illustrated in dashed lines in FIG. 2, and a lower plenum 46 (not illustrated in FIG. 2, but illustrated in FIGS. 5, 6, 8, 9 and 10). Both upper and lower plenums 44, 46 include a plurality of nozzles 56, 58 for directing heated combustion products from direct-fired, forced draft burners 24, 26 and recirculation fans and motors 34, 36 towards CMS 82, 84. The construction of one embodiment of plenums 44, 46 and nozzles 56, 58 is illustrated in FIGS. 12 and 13. FIG. 12 is a perspective and view of a sheet metal plenum 44 constructed of a set of sheet metal panels 160 and a set of vertical sheet metal nozzles 162, and FIG. 13 is an exploded view of a nozzle 162 and how it attaches to a pair of plenum panels 160 of FIG. 12 using screws 164. The design of the airflow pattern is unique due to the requirement of recirculating hot air from the direct-fired forced draft burners and recirculation fans onto the upper and lower surfaces of the CMS. The nozzle 162 design, having lips or projections 166 that protrude out through gap 168 between plenum panels 160 was based on having adjustable nozzles capable of processing the hot air onto each side surface of the CMS which resulted in uniform heating of the CMS. The nozzles were designed and manufactured by Epcon Industrial Systems, LP, The Woodlands, Texas, USA, the assignee of the present application. They are attached to the plenum panels using sheet metal screws, which allows the nozzles to be adjusted right or left, depending on the depth that the left and rights screws are driven into their receptacles.

In operation, hot air is forced by forced convection into lower and upper plenum supply ducts 62, 64 (FIG. 6), then into upper and lower heated air plenums 44, 46, then through nozzles 162 on the wall of each plenum facing the CMS. These nozzles 162 can be adjusted right and left (upstream and downstream), balancing the air flow and temperature uniformity inside the oven. One unique aspect of systems and methods of this disclosure is that hot air is supplied through the supply plenum nozzles 162 on both upper and lower portions of the oven. After being forced onto both major surfaces of the CMS, the somewhat less hot air is returned by flowing toward the sides of the oven and by virtue of somewhat lower pressure, filling open space in recirculation chamber 66 (as illustrated schematically in FIGS. 5, 6, 9, and 10), and drawn into and through inlets of return cooled air ducts 72, 74 (FIG. 6) and back into the recirculation fans 34, 36 (and 48, 50, when present on SDFFDCC 8). The forced convection impingement onto both sides of the CMS creates turbulence and high coefficient of heat transfer which results in great temperature uniformity and heat transferred to the CMS and its coating. This is done with constant hot air supply to both upper and lower surfaces of the CMS which forces the now cooler air to exit through return cooled air ducts 72, 74. The nozzles are screwed to the plenums using sheet metal screws. The reason for using the sheet metal screws is adjustability. It will be understood that other nozzle designs may be employed, and those designs are considered within the scope of the claimed systems.

Figure 4:
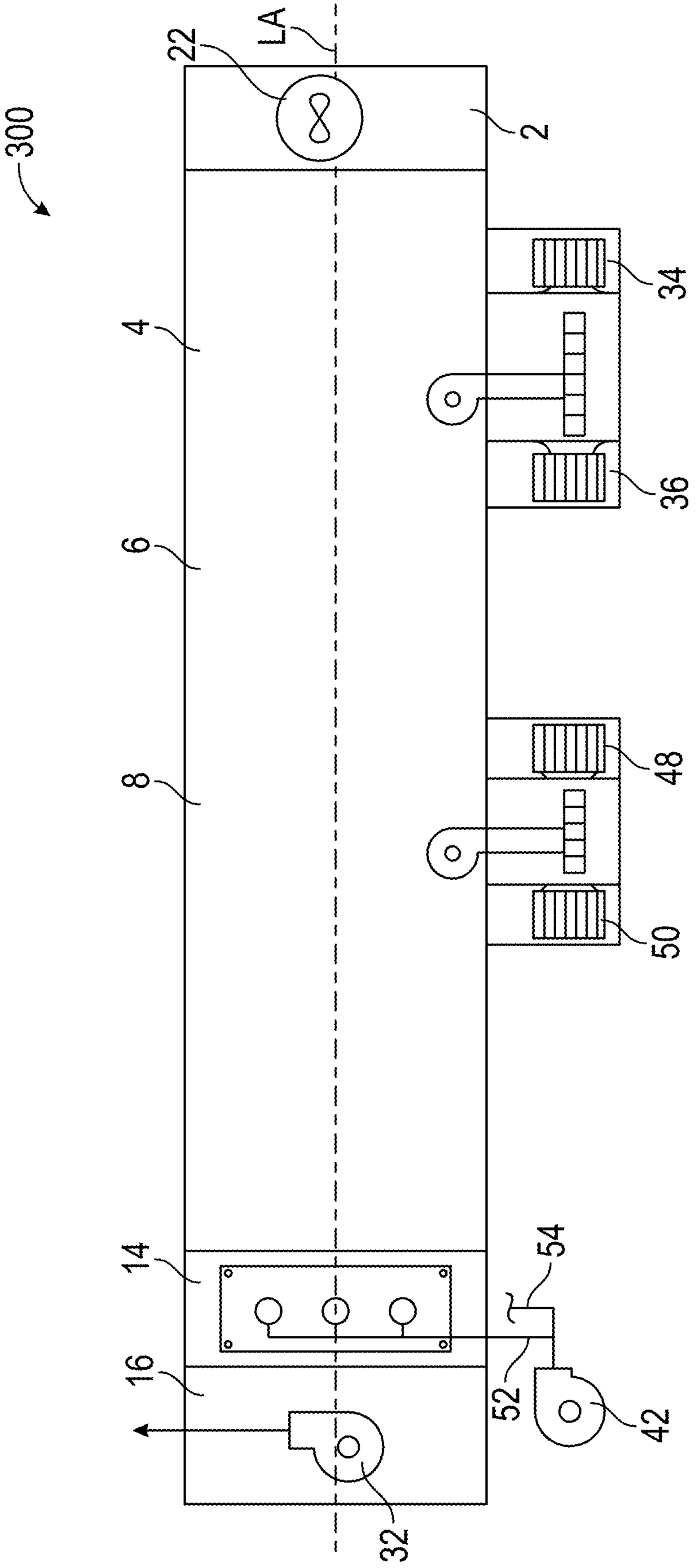
FIG. 4 is a detailed schematic plan view of another of system embodiment in accordance with the present disclosure.

FIG. 4 is a detailed plan view of the oven of a system embodiment 300 having four recirculation fans and motors 34, 36, 48, and 50, and illustrates a longitudinal axis (LA) of the oven.

Figure 5:
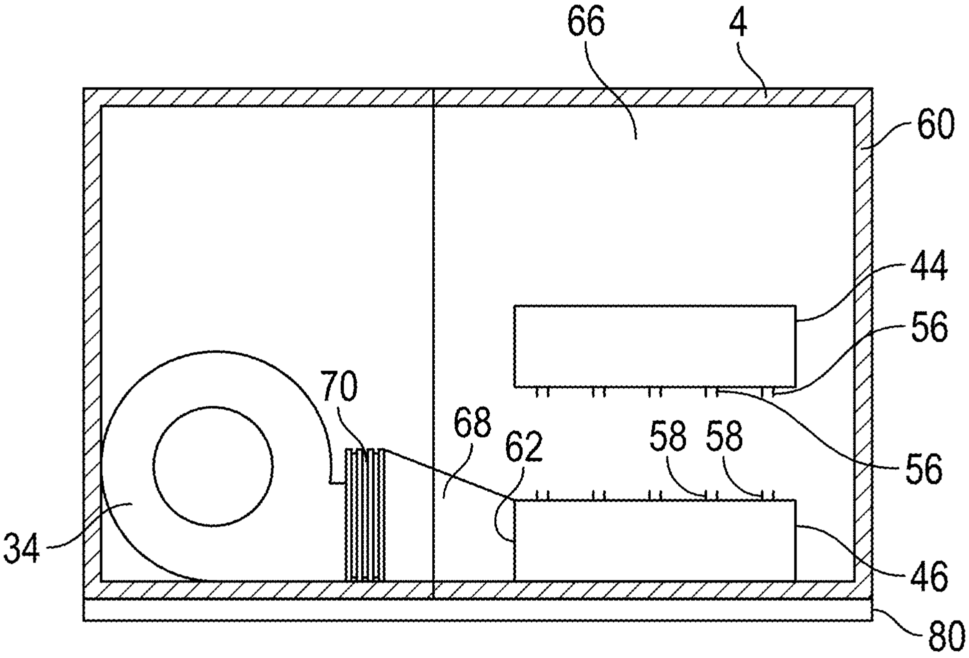
FIGS. 5 and 6 are schematic end and side elevation views, partially in cross-section, of a blower arrangement, plenums, and blower transition duct useful in systems of the present disclosure.
Figure 6:
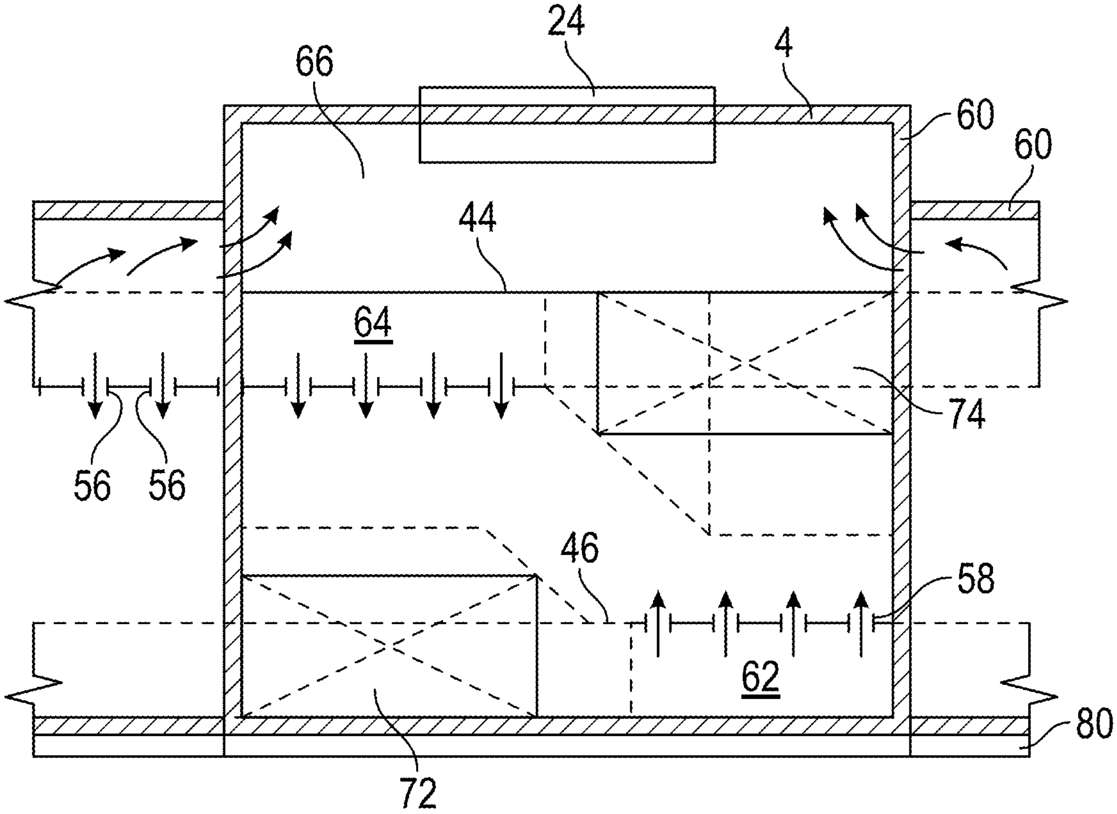
Figure 7:
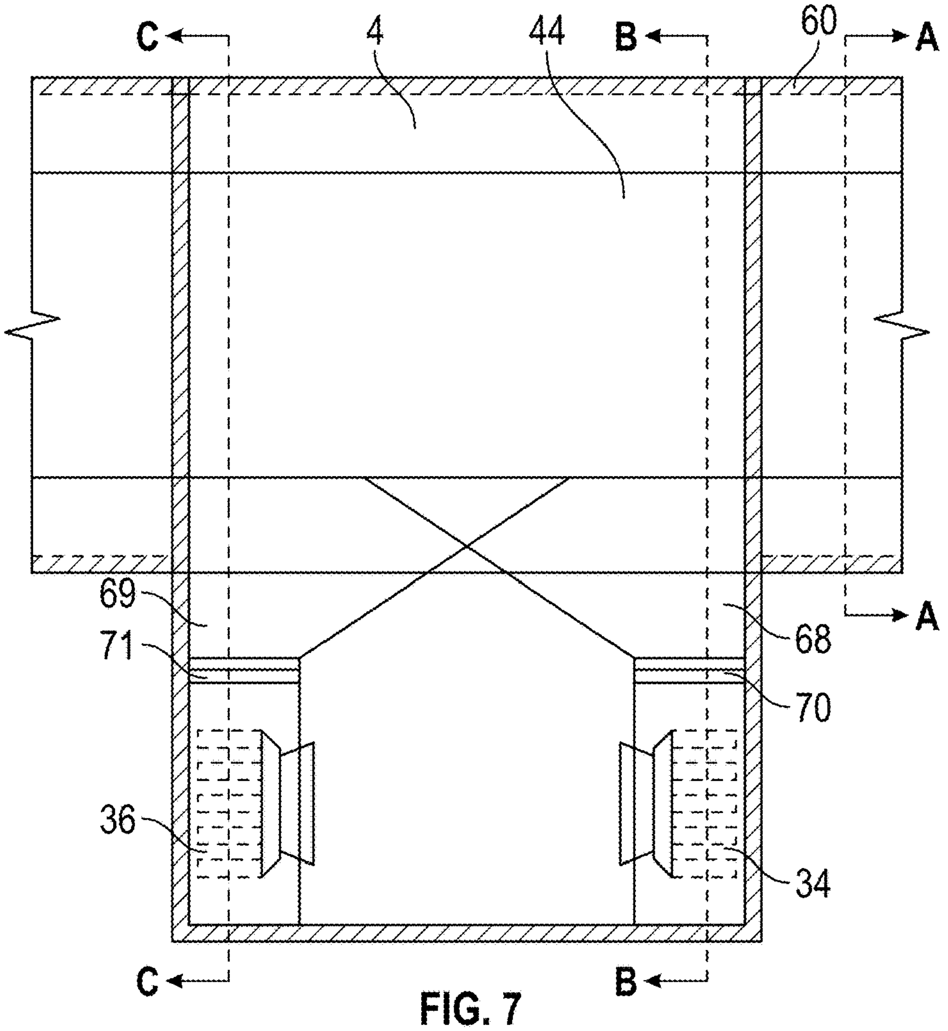
FIG. 7 is a schematic plan view.
Figure 8:
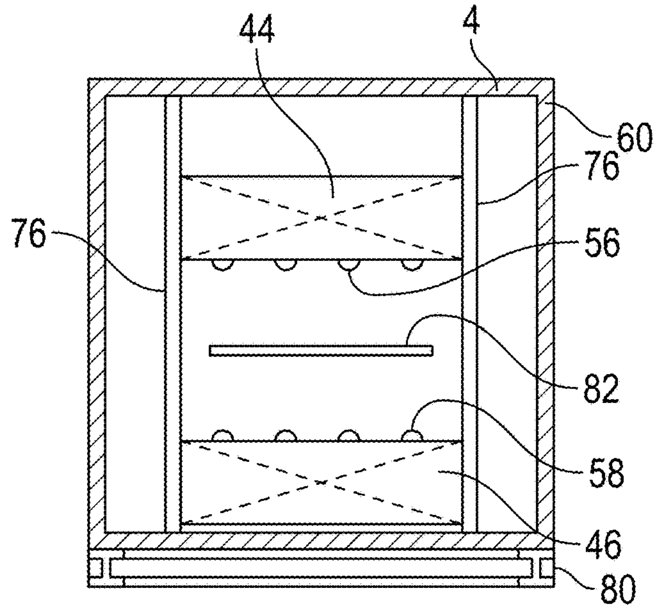
FIGS. 8, 9, and 10 schematic cross-sectional views of direct-fired, forced draft combustion chamber details in one system embodiment of the present disclosure.
Figure 9:
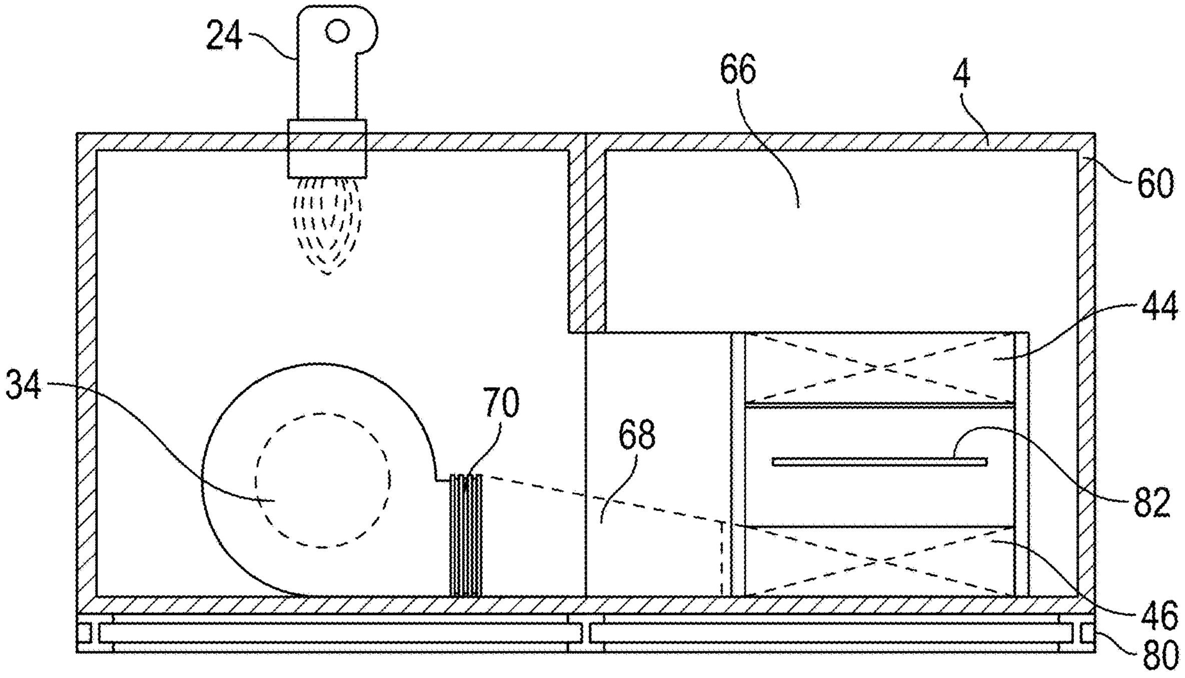
Figure 10:
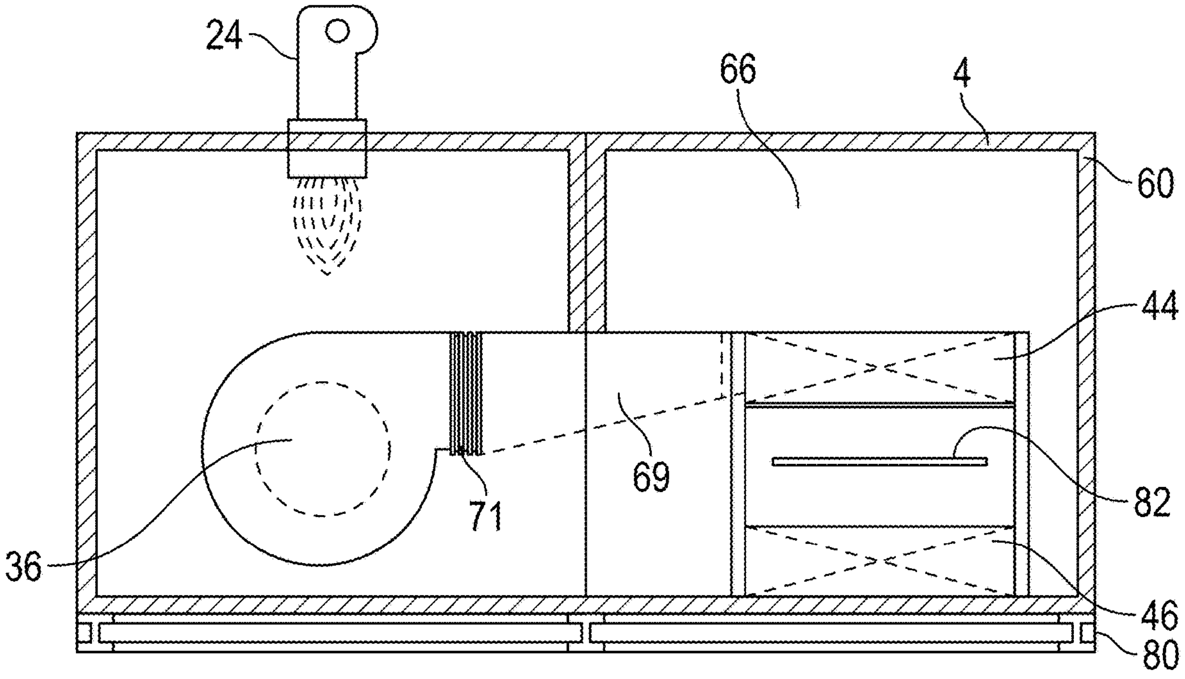

FIGS. 5 and 6 are schematic end and side elevation views, partially in cross-section, of a blower arrangement, plenums, and blower transition duct useful in systems of the present disclosure. FIG. 7 is a schematic plan view, and FIGS. 8, 9, and 10 schematic cross-sectional views of direct-fired, forced draft combustion chamber details in one system embodiment of the present disclosure taken along cross-sections A-A, B-B, and C-C as indicated in FIG. 7. Recirculation blowers and motors 34, 36 (motors not illustrated) feed heated air and combustion products through respective transition ducts 68, 69 and expansion joints 70, 71, and then into lower plenum 46 having nozzles 58 and upper plenum 44 having nozzles 56. A frame 76 secures plenums 44, 46 in the oven, while the oven sits on a skid 80, which may be any platform or support.

In operation, a first heating cycle may be defined as when the oven is operating continuously in normal fashion to accept a wet-coated, first cycle CMS 82, forming a dried, uncured coated first cycle heated CMS 84 and then a dried, cured first cycle coated CMS. When the CMS stops for whatever reason, for example an emergency, or to change CMS feed or product coils, a cooling cycle is initiated, in certain embodiments immediately after the CMS stops, in some other embodiments simultaneous with stoppage of the CMS. In either case, the cooling cycle comprises actuators 38, 40 opening cooling doors 12A, 12B, other actuators starting QCD fan 22 and exhaust fan 32. Meanwhile direct-fired forced draft burners and direct-fired flame impingement burners are shut off except for pilot burners in one or more of each so that the burners may be quickly re-ignited during a second heating cycle. When the second heating cycle is initiated, cool down doors 12A, 12B are closed, exhaust fan 32 and QCD fan 22 are stopped. In one example, the oven may have a peak heating temperature of about 530° F. (about 277° C.) and be cooled down in a matter of seconds to a temperature of about 150° F. (about 66° C.), and then brought back to about 530° F. (about 277° C.) in a second heating cycle.

Figure 11A:
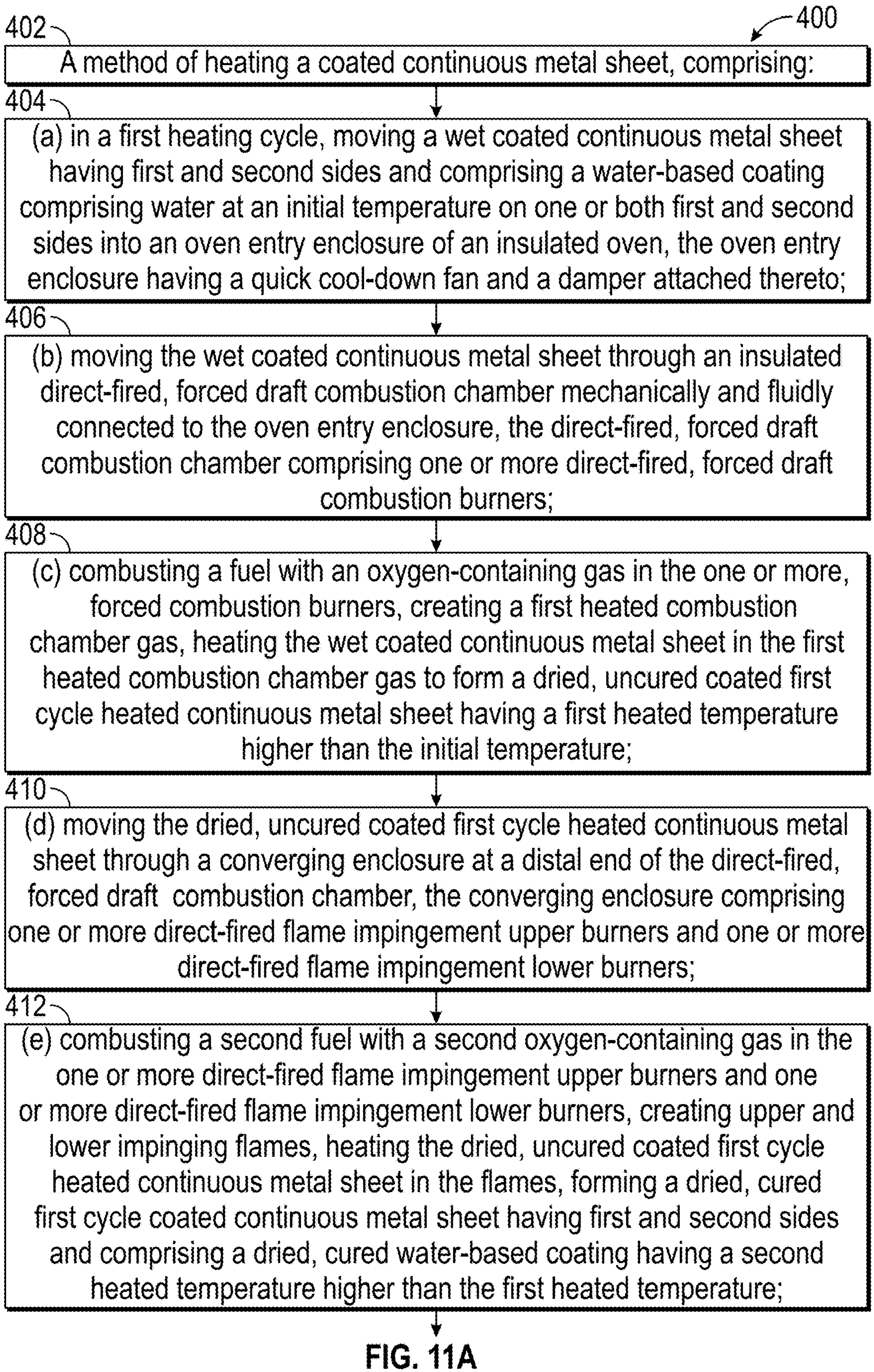
FIGS. 11A and 11B illustrate a logic diagram of one method embodiment in accordance with the present disclosure.
Figure 11B:
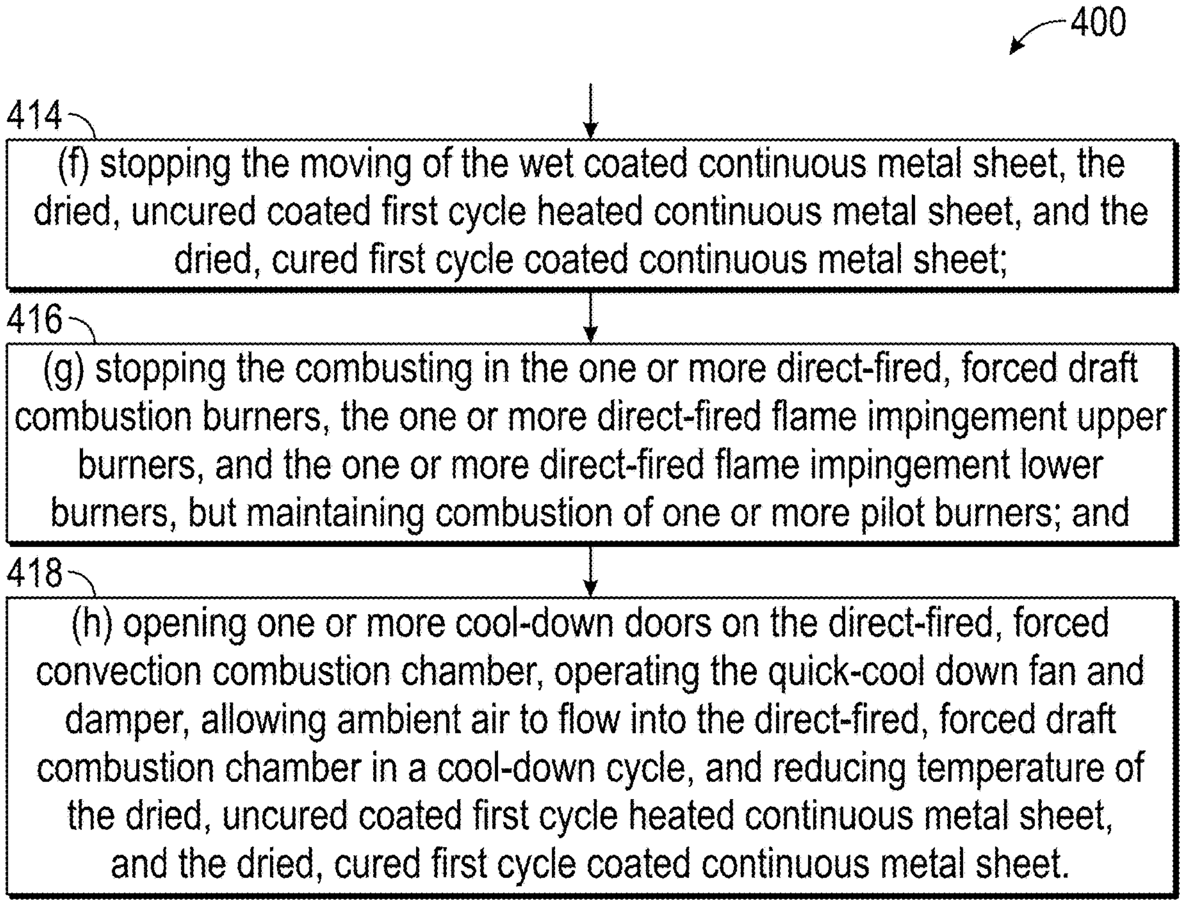

FIGS. 11A and 11B illustrate a logic diagram of one method embodiment 400 in accordance with the present disclosure. Method embodiment 400 comprises (or consists essentially of, or consists of):

(a) in a first heating cycle, moving a wet coated continuous metal sheet having first and second sides and comprising a water-based coating comprising water at an initial temperature on one or both first and second sides into an oven entry enclosure of an insulated oven, the oven entry enclosure having a quick cool-down fan and a damper attached thereto (box 402);

(b) moving the wet coated continuous metal sheet through an insulated direct-fired, forced draft combustion chamber, the direct-fired, forced draft combustion chamber mechanically and fluidly connected to the oven entry enclosure, the direct-fired, forced draft combustion chamber comprising one or more direct-fired, forced draft combustion chamber burners (box 404);

(c) combusting a fuel with an oxygen-containing gas in the one or more direct-fired, forced draft combustion chamber burners, creating a first heated direct-fired, forced draft combustion chamber gas, heating the wet coated continuous metal sheet in the first heated direct-fired, forced draft combustion chamber gas to form a dried, uncured coated first cycle heated continuous metal sheet having a first heated temperature higher than the initial temperature (box 406);

(d) moving the dried, uncured coated first cycle heated continuous metal sheet through a converging enclosure at a distal end of the oven direct-fired, forced draft combustion chamber, the converging enclosure comprising one or more direct-fired flame impingement upper burners and one or more direct-fired flame impingement lower burners (box 408);

(e) combusting a second fuel with a second oxygen-containing gas in the one or more direct-fired flame impingement upper burners and one or more direct-fired flame impingement lower burners, creating flames impinging onto the dried, uncured coated first cycle heated continuous metal sheet, forming a dried, cured first cycle coated continuous metal sheet having first and second sides and comprising a dried, cured water-based coating having a second heated temperature higher than the first heated temperature (box 410);

(f) stopping the moving of the wet coated continuous metal sheet, the dried, uncured coated first cycle heated continuous metal sheet, and the dried, cured first cycle coated continuous metal sheet (box 412);

(g) stopping the combusting in the one or more direct-fired forced draft burners, the one or more direct-fired flame impingement upper burners, and the one or more direct-fired flame impingement lower burners, but maintaining combustion of one or more pilot burners (box 414); and (h) opening one or more cool-down doors on the direct-fired, forced draft combustion chamber, operating the quick cool-down fan and damper, allowing ambient air to flow into the direct-fired, forced draft combustion chamber in a cool-down cycle, and reducing temperature of the dried, uncured coated first cycle heated continuous metal sheet, and the dried, cured first cycle coated continuous metal sheet (box 416).

Other methods of this disclosure would feature use of the QCD fan, exhaust fan, and dampers in two or more cool-down cycles, and use of upper and lower plenums having nozzles as described herein in two or more heating cycles.

Suitable circulation blowers have a capacity ranging from about 5,000 to about 50,000, CFM, or from about 10,000 to about 20,000 CFM, and may use an electric motor driver with variable flow, such as having a power of about 10 to about 30 HP, or from about 15 to 25 HP. Such blowers are commercially available, for example, from Twin City Fans & Blowers, Minneapolis, MN.

Conduits, direct-fired forced draft combustion chambers, plenums, ducts and other equipment may comprise aluminized 18 gauge steel or stainless steel, such as 304 or other stainless steel. Other gauges may be used if desired, from 10 to 30 gauge. 18 gauge steel is about 0.05 inch thick. See for example 18 U.S.C. § 206 for standard thicknesses used in the United States. In certain embodiments, oven walls may be constructed with insulation sandwiched between an inner layer of 18 gauge aluminized steel (AL steel) and an out layer of 18 gauge chromated steel (CR steel). Aluminized steel is a carbon steel that has been hot-dip coated on both sides with aluminum-silicon alloy. This process assures a tight metallurgical bond between the steel sheet and the aluminum coating, producing a material with a unique combination of properties possessed neither by steel nor by aluminum alone. "CR steel" is chrome-plated steel. Related but different are chromate conversion coatings or alodine coatings, which is a type of conversion coating used to passivate steel aluminum, zinc, cadmium, copper, silver, titanium, and tin alloys. More exotic metals may be used for all or portions of these, if desired, such as precious metals and/or noble metals (or alloys). Noble metals and/or other exotic corrosion and/or fatigue-resistant materials include metals such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal may be employed. In certain embodiments a protective layer or layers or components may comprise an alloy attached to a base metal using brazing, welding or soldering of certain regions.

Insulating material may be mineral wool, glass wool, ceramic fiber based, or other insulating material. Insulation materials useful in systems and methods of this disclosure should be durable, fire resistant, weatherproof, and of acceptable R-value depending on the heating or cooling duty, or capable of being modified or combined with other materials into a composite insulation material to acceptable R-values. A variety of insulation products may be used, including aerogels, fiberglass (the glass fiber itself bonded together with thermosetting resin into a low density, lofty web, not glass fiber reinforced plastic), the thermoset foamed resin known under the trade designation POLYISO-FOAM, mineral wool, and the foamed glass product known under the trade designation FOAMGLAS®. These materials are discussed here briefly.

"Aerogel" is a generic word for a synthetic porous ultralight material derived from a gel, in which the liquid component of the gel has been replaced with a gas. The result is a solid with extremely low density and low thermal conductivity. Aerogels may be based on alumina, chromia, tin dioxide, or carbon (such as aerographite and aerographene). The term "aerogel" does not have a designated material with set chemical formula but the term is used to group all the material with a certain geometric structure. Useful aerogels include those known under the trade designations PYROGEL® XT-E, PYROGEL® XT-F, and CRYOGEL® Z, available commercially from Aspen Aerogels®, Inc., Northborough, MA (U.S.A.) which manufactures flexible, durable industrial insulation products that meet the most demanding requirements and span service temperatures ranging from −460° F. (−270° C.) to 1200° F. (650° C.).

Fiberglass insulation may be used in low temperature curing ovens (less than 450° F. (232° C.). Fiberglass insulation is manufactured from inorganic glass fibers bonded together with thermosetting resin into a lofty mat. Fiberglass insulation can be used in plain or faced form. Faced fiberglass insulation is designed for systems that operate below ambient temperatures where vapor barrier protection is required. Fiberglass is available in a variety of densities for use on systems which operate up to 450° F. (232° C.). For faced products, surface temperature should not exceed 150° F. (66° C.). It can be readily cut with an ordinary knife and secured utilizing mechanical fasteners and/or adhesives.

Mineral wool insulation is made of inorganic fibers derived from rock, such as basalt, a volcanic rock, adhered together at various random points with a thermosetting resin binder. Advanced manufacturing technology ensures consistent product quality, with high fiber density and low shot content, for excellent performance in high temperature thermal control and fire resistance applications. Mineral wool is available in a variety of densities and provides excellent thermal insulation performance for mechanical, power and process systems operating from sub-ambient to 1200° F. (650° C.). Good thermal conductivity values help maximize control of heat loss, contributing to reduced operating costs and greater energy savings.

Ceramic fiber insulation is preferred for higher temperature curing ovens and provides excellent thermal insulation performance for mechanical, power and process systems operating from about 1000° F. (about 540° C.) up to about 3000° F. (about 1650° C.), and is available from several commercial suppliers, such as Thermal Ceramics. The composition may comprise one or more ceramic fibers. One ceramic fiber insulation, known under the trade designation CERABLANKET AC2, from Thermal Ceramics, comprises from 45 to 47 percent alumina and from 53 to 55 percent silica, has a thermal conductivity (ASTM C-201) at mean temperature of 600° C. of 0.40 W/mK, and a published maximum use temperature of 2150° F. (1177° C.).

The cellular glass insulation known under the trade designation FOAMGLAS®, available from Pittsburgh Corning Corporation, Pittsburgh, PA, U.S.A., is another insulation product that may be used in systems of the present disclosure. This product comprises millions of sealed glass cells, is lightweight, rigid, and manufactured in block form, then fabricated into a wide range of shapes and sizes. It is useful for curing ovens operating at temperature up to about 900° F. (about 480° C.). The material exhibits constant insulating efficiency, is noncombustible, non-absorbent, impermeable to water and water vapor, and corrosion/chemical resistant. According to the manufacturer, this product can be certified to conform to the requirements of ASTM C552 (Standard Specification for Cellular Glass Thermal Insulation (Grade 6)).

Composite insulation materials may be used in systems of the present disclosure. Composite insulation is the combination of any of the insulation products mentioned herein to create a custom insulation panel. Due to height and weight of the panel, temperature of the oven to be insulated, and thermal conservation, specific insulation properties are required. The edition of a single layer of polyiso material to a fiberglass or mineral wool panel adds rigidity, strength, prevents "oil canning", and maintains non-combustible requirements.

Methods and systems of the present disclosure may include one or more thermocouples, temperature sensors, and/or other sensors for monitoring and/or control of temperature of the gas flows and material being processed, for example using one or more process controllers. A temperature signal may be transmitted by wire or wirelessly from a thermocouple or other sensor to a controller, which may control the method and system by adjusting any number of parameters, for example air flow rate produced by recirculation fans may be adjusted through use of a signal to the air recirculation fan motor; one or more of flow rate of fuel and/or oxidant may be adjusted via one or more signals, it being understood that suitable transmitters and actuators, such as valves and the like, are not illustrated for clarity. Actuators for QCD doors, QCD fans and exhaust fans may be similarly controlled.

Methods and systems in accordance with the present disclosure may also comprise one or more oxy-fuel burners, but as they are only used in certain situations, are more likely to be air/fuel burners. In certain embodiments, all combustion burners and burner panels may be oxy/fuel burners or oxy-fuel burner panels (where "oxy" means oxygen, or oxygen-enriched air, as described earlier), but this is not necessarily so in all embodiments; some or all of the combustion burners or burner panels may be air/fuel burners. Furthermore, heating may be supplemented by electrical heating in certain embodiments, in certain zones. Oxy-fuel burners and technologies provide high heat transfer rates, fuel consumption reductions (energy savings), reduced volume of flue gas, and reduction of pollutant emission, such as oxides of nitrogen (NOx), carbon monoxide (CO), and particulates.

In certain methods and systems, control of fuel and/or oxidant to burners may be adjustable with respect to flow of the fuel or oxidant or both. Adjustment may be via automatic, semi-automatic, or manual control. For example, combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters burners or burner panels, temperature of the primary oxidant as it enters burners or burner panels, temperature of the effluent (exhaust) at the burner exhaust exit, pressure of the primary oxidant entering burners or burner panels, humidity of the oxidant, burner or burner panel geometry, combustion ratio, and combinations thereof. Flow diverter and nozzle positions in plenums and other ducts may be adjusted or controlled to increase heat transfer in heat transfer substructures and exhaust conduits.

In burners used in the presently disclosed systems and methods, the velocity of the fuel in the various burners and/or burner panel embodiments depends on the burner/burner panel geometry used. The upper limit of fuel velocity depends primarily on the desired temperature of the hot combustion gases and the geometry of the burner, in particular the direct-fired flame impingement burners; if the fuel velocity is too low, the flame temperature may be too low, providing inadequate temperature in the oven, which is not desired, and if the fuel flow is too high, flame and/or combustion products might impinge not only on the CMS but on other heat transfer surfaces or oven walls, or be wasted, which is also not desired. Similarly, oxidant velocity should be monitored so that flame and/or combustion products do not impinge on heat transfer surfaces such as oven walls or be wasted. Oxidant velocities depend on fuel flow rate and fuel velocity.

In certain embodiments the direct-fired flame impingement burners may be packaged burners. Suitable packaged burners include those available from Honeywell Maxon, Honeywell-Eclipse, Fives (Paris, France) (formerly North American Manufacturing), and others. Packaged burners may optionally include a variable frequency drive, remote control panel, and a pilot train, including a regulator, solenoid valve, and manual valve, a burner management system (BMS) such as Siemens LMV51 or Autoflame Mini Mark 8. The burners also include a NEMA 12 control panel with power on switch and indicator lights for power, pilot, main flame, and flame failure, and may optionally include a parallel positioning system with air and fuel actuators. The burners may have a heat output ranging from about 4 to about 30 million Btu/hr. Such burners are able to burn natural gas, propane, butane, and LPG blends, and fuel oil.

In certain embodiments the direct-fired forced draft combustion chamber burners may be line burners. Suitable line burners include those available from Honeywell Maxon and other manufacturers. Line burners available from Honeywell Maxon include those known under the trade designations APX, COMBUSTIFUME, CROSSFIRE, DELTA HC AIRFLO, LO-NOx, LV AIRFLO, NP-LE LOW EMISSIONS AIRFLO, NP-RG AIRFLO, and others, depending on the oven heat load. For example, the line burners known under the trade designation APX have a unibody construction, nozzle mix burner having a capacity of up to about 1.4 MMBTU/hr. per foot of length. The length of line burner to use is then simply a function of how many BTUs are desired for the selected thermal load of the FDFFDCC, the SDFFDCC, or further combustion chambers.

Suitable pilot burners, if not included in the packaged or line burners themselves, include those known under the trade designation LVDT-HC pilot burner available from Honeywell Maxon, which are nozzle-mix pilot burners having a spark igniter, and that may be used with and mounted on Honeywell Maxon line burners known under the trade designation AIRFLO LV, HC, DELTA-TE and COMBUSTIFUME.

A combustion heating process control scheme may be employed. A master controller may be employed, but the disclosure is not so limited, as any combination of controllers could be used. The controller may be selected from PI controllers, PID controllers (including any known or reasonably foreseeable variations of these) and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner and oven control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules and may supervise interaction between databases and one or more software application modules. A feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

The controller may utilize Model Predictive Control (MPC). MPC is an advanced multivariable control method for use in multiple input/multiple output (MIMO) systems. MPC computes a sequence of manipulated variable adjustments in order to optimise the future behavior of the process in question. It may be difficult to explicitly state stability of an MPC control scheme, and in certain embodiments of the present disclosure it may be necessary to use nonlinear MPC. In so-called advanced control of various systems, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. § 112, Section F, unless "means for" is explicitly recited together with an associated function. "Means for" clauses are intended to cover the structures, materials, and/or acts described herein as performing the recited function and not only structural equivalents, but also equivalent structures.

What is claimed is:

1. A system comprising:

(a) an insulated oven having an entry end, an exit end, and a longitudinal axis and comprising:

(i) an oven entry enclosure at the entry end having one or more cool-down fans and one or more dampers attached thereto;

(ii) a first direct-fired, forced draft combustion chamber mechanically and fluidly connected to the oven entry enclosure and comprising a first set of one or more direct-fired, forced draft combustion chamber burners;

(iii) a first transition chamber mechanically and fluidly connected to an exit of the first direct-fired, forced draft combustion chamber;

(iv) a second direct-fired, forced draft combustion chamber mechanically and fluidly connected to the first transition chamber and comprising a second set of one or more direct-fired, forced draft combustion chamber burners;

(v) a second transition chamber mechanically and fluidly connected to an exit of the second direct-fired, forced draft combustion chamber;

(vi) a converging enclosure mechanically and fluidly connected to a distal end of the second transition chamber, the converging enclosure having a cross-sectional area that decreases along the longitudinal axis from an exit of the second transition section, the converging enclosure comprising one or more upper direct-fired flame impingement burners and one or more lower direct-fired flame impingement burners;

(vii) an oven exit enclosure mechanically and fluidly connected to an exit of the converging enclosure and having one or more exhaust fans fluidly connected to the oven exit enclosure;

(viii) one or more cool-down doors on the second transition chamber; and (ix) one or more pilot burners;

(b) one or more first actuators configured to stop movement through the insulated oven of a wet coated continuous metal sheet, a dried, uncured coated first cycle heated continuous metal sheet, and a dried, cured first cycle coated continuous metal sheet upon receipt of a first signal;

(c) one or more second actuators configured to stop combustion in the first and second sets of one or more direct-fired, forced draft combustion chamber burners, the one or more direct-fired flame impingement upper burners, and the one or more direct-fired flame impingement lower burners, but maintain combustion of the one or more pilot burners; and (d) one or more third actuators configured to open the one or more cool-down doors, and one or more fourth actuators configured to operate the one or more cool-down fans and the one or more dampers to allow ambient air to flow into the first and second direct-fired, forced draft combustion chambers in a cool-down cycle upon receipt of a control signal to begin the cool-down cycle and reduce temperature of the dried, uncured coated first cycle heated continuous metal sheet and the dried, cured first cycle coated continuous metal sheet.

2. The system of claim 1 wherein the first and second sets of the one or more direct-fired, forced draft combustion chamber burners are line burners.

3. The system of claim 1 wherein the one or more upper direct-fired flame impingement burners are direction-adjustable packaged burners, and the one or more lower direct-fired flame impingement burners are direction-adjustable packaged burners.

4. The system of claim 1 wherein the one or more exhaust fans are configured to maintain a negative pressure in the insulated oven.

5. The system of claim 1, further comprising a first recirculation fan and motor mechanically and fluidly connected to the first direct-fired, forced draft combustion chamber.

6. The system of claim 5, further comprising an upper plenum and a lower plenum, each of the upper and lower plenums positioned internally of the first direct-fired, forced draft combustion chamber and each including a plurality of nozzles for directing heated combustion products from the first set of direct-fired, forced draft burners and the first recirculation fan and motor towards the dried, uncured coated first cycle heated continuous metal sheet.

* * * * *